US008885895B2

(12) United States Patent
Morioka et al.

(10) Patent No.: US 8,885,895 B2
(45) Date of Patent: Nov. 11, 2014

(54) FINGERPRINT AUTHENTICATION DEVICE AND COMPUTER READABLE MEDIUM

(75) Inventors: Kenichi Morioka, Kanagawa (JP); Hirofumi Muramatsu, Tokyo (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 420 days.

(21) Appl. No.: 13/282,946

(22) Filed: Oct. 27, 2011

(65) Prior Publication Data

US 2012/0106808 A1  May 3, 2012

(30) Foreign Application Priority Data

Oct. 28, 2010  (JP) ................................. 2010-242280

(51) Int. Cl.
*G06K 9/00* (2006.01)

(52) U.S. Cl.
CPC .................................. *G06K 9/0008* (2013.01)
USPC ........... 382/124; 382/115; 382/125; 382/170; 382/266; 382/273

(58) Field of Classification Search
USPC ......... 382/100, 115, 124, 125, 168–172, 181, 382/190, 191, 215, 217, 266, 270–275
See application file for complete search history.

(56) References Cited

U.S. PATENT DOCUMENTS

| 5,524,070 | A | * | 6/1996 | Shin et al. ...................... 382/272 |
| 5,926,555 | A | * | 7/1999 | Ort et al. ......................... 382/124 |
| 6,518,560 | B1 | * | 2/2003 | Yeh et al. ........................ 382/115 |
| 7,512,256 | B1 | * | 3/2009 | Bauchspies ................... 382/124 |
| 2001/0036300 | A1 | * | 11/2001 | Xia et al. ........................ 382/125 |
| 2002/0146178 | A1 | * | 10/2002 | Bolle et al. .................... 382/254 |
| 2006/0056700 | A1 | * | 3/2006 | Abiko et al. ................... 382/190 |
| 2006/0215887 | A1 | * | 9/2006 | Nishimura et al. ........... 382/124 |
| 2010/0266169 | A1 | * | 10/2010 | Abiko ............................ 382/124 |

FOREIGN PATENT DOCUMENTS

| JP | 8272953 | A | 10/1996 |
| JP | H10134178 | A | 5/1998 |
| JP | 2003337949 | A | 11/2003 |
| JP | 2008529156 | | 7/2008 |

OTHER PUBLICATIONS

Lin Hong, Yifei Wan, and Anil Jain, "Fingerprint Image Enhancement: Algorithm and Performance Evaluation", IEEE, Transactions on Pattern Analysis and Machine Intelligence, vol. 20, No. 8, Aug. 1998, pp. 777-789.*
Japanese Office Action dated Jun. 3, 2014.

* cited by examiner

*Primary Examiner* — Eric Rush
(74) *Attorney, Agent, or Firm* — Volentine & Whitt, PLLC

(57) ABSTRACT

A fingerprint authentication device includes: a fingerprint acquisition section that acquires fingerprint image data; a fingerprint image correction processing section that corrects a pixel value by using a correction coefficient for making a first pixel value of the brightest pixel in a group of pixels at which an integrated value of a number of pixels at a dark portion side in a histogram becomes a predetermined proportion with respect to an integrated value of a number of all pixels, be a brighter second pixel value; a spectral data generation section that generates a spectral data matrix including directions of ridges of a fingerprint and a frequency of the fingerprint; a registered spectral data matrix archive section that archives a registered spectral data matrix; a fingerprint verification section that verifies the spectral data matrix and the registered spectral data matrix; and an authentication results output section that outputs results of authentication.

10 Claims, 13 Drawing Sheets

FIG.8

| -1 | 0 | 1 |
|----|---|---|
| -2 | 0 | 2 |
| -1 | 0 | 1 | fx

| -1 | -2 | -1 |
|----|----|----|
| 0  | 0  | 0  |
| 1  | 2  | 1  | fy

FIG.13
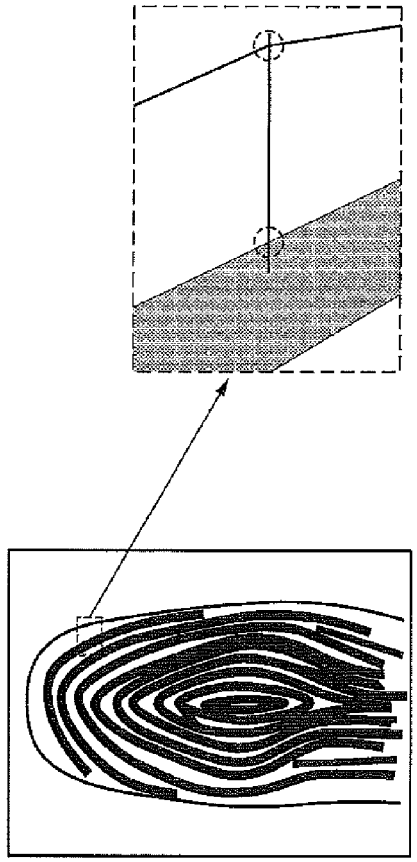
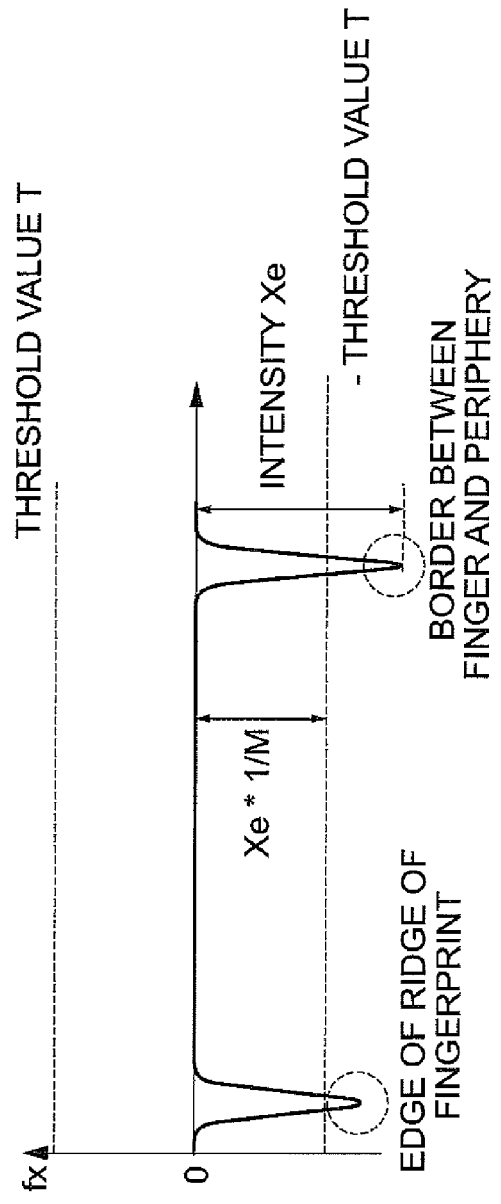

FINGERPRINT AUTHENTICATION DEVICE AND COMPUTER READABLE MEDIUM

CROSS-REFERENCE TO RELATED APPLICATION

This application claims priority under 35 USC 119 from Japanese Patent Application No. 2010-242280 filed on Oct. 28, 2010, the disclosure of which is incorporated by reference herein.

BACKGROUND OF THE INVENTION

1. Field of the Invention

The present invention relates to a fingerprint authentication device and a computer readable medium, and in particular, relates to a fingerprint authentication device that carries out correction of pixel values of acquired fingerprint image data and carries out fingerprint authentication in accordance with the spectral data method by using the corrected image data and to a computer readable medium that stores a program for fingerprint authentication.

2. Description of the Related Art

Fingerprint authentication is used as one type of biometric authentication. Mainly the following three methods are known for fingerprint authentication.

The first method is pattern comparison. This method verifies a fingerprint by comparing a portion of inputted image data of a fingerprint with a template recorded in a device.

The second method is minutiae comparison that finds characteristic points from inputted image data of a fingerprint, and compares these characteristic points with minutia points of a template recorded in a device.

The third method is the spectral data method that divides an image of a fingerprint, that is inputted from a line sensor or an area sensor, into horizontally-long rectangular images, and thereafter, for each of the rectangular images, generates spectral data by digitizing information such as the directions of the mountain portions (ridges) of the fingerprint, and the frequency that expresses how many ridges there are in a predetermined range, and the like.

Further, the spectral data obtained at the respective rectangular images is plotted as a matrix so as to generate a spectral data matrix, and the obtained spectral data matrix is compared with a registered spectral data matrix for verification that is recorded in a device, and authentication of the fingerprint is carried out.

FIG. 1 is a schematic drawing of a fingerprint authentication device in accordance with the prior art that employs the spectral data method.

As shown in FIG. 1, a fingerprint authentication device in accordance with the related art that employs the spectral data method has: a fingerprint input device 101 that is a fingerprint sensor that scans or images a fingerprint and acquires fingerprint image data; a fingerprint image storage section 102 that stores this fingerprint image data; a spectral data generation section 103 that computes the directions of the mountain portions of the fingerprint and the frequency of the fingerprint in the fingerprint image data stored in the fingerprint image storage section 102, and generates a spectral data matrix; a spectral data matrix storage section 104 that stores the spectral data matrix; a registered spectral data matrix archive section 105 that archives a registered spectral data matrix that is referred to at the time of fingerprint authentication; a fingerprint verification section 106 that verifies the spectral data matrix stored in the spectral data matrix storage section 104 with the registered spectral data matrix that is archived in the registered spectral data matrix archive section 105; and an authentication results outputting section 107 that outputs results of authentication by the fingerprint verification section 106.

The fingerprint input device 101 is a line sensor or an area sensor, and scans or images the fingerprint of a finger that is pushed on a sensor portion, and acquires fingerprint image data such as shown in the lower left of FIG. 2.

The fingerprint image data acquired by the fingerprint input device 101 is stored in a fingerprint image storage section 102.

The fingerprint image data stored in the fingerprint storage section 102 is read-out by the spectral data generation section 103, and the spectral data generation section 103 generates a spectral data matrix from the read-out fingerprint image data. The generated spectral data matrix is stored in the spectral data matrix storage section 104.

The fingerprint verification section 106 compares a registered spectral data matrix, that has been previously stored in the registered spectral data matrix archive section 105, and the spectral data matrix, that has been generated by the spectral data generation section 103 and stored in the spectral data matrix storage section 104, and, from the proportion of similar spectral data, judges matching or non-matching of the spectral data matrices.

In the spectral data method, the data of the matrices used in verification uses less memory than images of fingerprints, and comparison and verification of digitized data is carried out. Therefore, there is the advantage that the algorithm can be simplified. An invention relating to a fingerprint verification method in accordance with this method and a device therefor is disclosed in Japanese Patent Application National Publication No. 2008-529156.

Further, Japanese Patent Application Laid-Open (JP-A) No. 08-272953 discloses an invention that, when a pixel value of fingerprint image data exceeds a threshold value, adjusts the density of the image by adding or subtracting that pixel value.

When acquiring an image of a fingerprint by using a line sensor or an area sensor at a fingerprint authentication device, there are cases in which a finger is pressed strongly on the sensor portion, and therefore, an image in which the ridges of the fingerprint are squashed and thickened is inputted as shown in the bottom right of FIG. 2.

In the fingerprint image data that the sensor reads, the ridges that are the mountain portions of the fingerprint are displayed by black lines, and the valley portions of the fingerprint are displayed in white. In the fingerprint image data at the bottom right of FIG. 2, the ridges are displayed thick as compared with the fingerprint image data at the lower left of FIG. 2, and there is a state in which it is difficult to differentiate between the ridges and the valley portions.

This phenomenon in which the ridges of a fingerprint are squashed and become thicker can occur, in addition to when a finger is pressed strongly on the sensor portion, also due to differences in the sensitivity of the sensor or problems with adjustment of the sensor.

In any of these cases, the thickness of the ridges of the fingerprint and the overall density of the fingerprint image data are different from fingerprint image data that is acquired by the finger not being pressed strongly on the sensor portion. In an image that is used in fingerprint authentication, at the ridges of the fingerprint and the portions other than the ridges, the pixel values should naturally fluctuate gradually from dark to light, as shown in the lower left of FIG. 2. However, in the image shown in the lower right of FIG. 2 in which the ridges of the fingerprint are squashed and thickened, in addition to the ridges being displayed as thick, the gradual fluctuations in the pixel values from dark to light are not distinct. As a result, it is easy for differences to arise between the fingerprint image data of the lower left of FIG. 2 and the fingerprint image data of the lower right of FIG. 2, especially in the frequency data thereof when these fingerprint image data are made into spectral data.

Even in the case of frequency data that is generated from fingerprint image data relating to a same fingerprint, if the numerical values of the frequencies are different, the spectral data matrices that include the frequency data also differ. In such a case, the probability that the fingerprint verification device will erroneously judge that the frequency data do not match is high, and appropriate fingerprint authentication cannot be realized.

Although an invention that adjusts the density of an image is disclosed in JP-A No. 08-272953, the adjusting of the density of an image of the invention relating to JP-A No. 08-272953 is merely the adding or subtracting of a pixel value that exceeds a threshold value. In this method, pixel values are added equally to the portions that are squashed black of the image at the lower right in FIG. 2, and these portions are corrected so as to be lighter uniformly, and there is the concern that the contrast of the image, which is needed in fingerprint authentication, will suffer.

SUMMARY OF THE INVENTION

The present invention has been made in view of the above circumstances and provides a fingerprint authentication device and a computer readable medium that stores a program for fingerprint authentication.

In accordance with a first aspect of the present invention, there is provided a fingerprint authentication device including: a fingerprint acquisition section that scans or images a fingerprint and acquires fingerprint image data; a fingerprint image correction processing section that generates a histogram of pixel values on the basis of the fingerprint image data acquired by the fingerprint acquisition section, and corrects a pixel value of each pixel by using a correction coefficient for making a first pixel value, that relates to the brightest pixel in a group of pixels at which an integrated value of a number of pixels at a dark portion side in the histogram becomes a predetermined proportion with respect to an integrated value of a number of all pixels, be a second pixel value that is brighter than the first pixel value; a spectral data generation section that, from fingerprint image data corrected by the fingerprint image correction processing section, generates a spectral data matrix of which components are directions of ridges of the fingerprint and a frequency of the fingerprint; a registered spectral data matrix archive section that archives a registered spectral data matrix that is referred to at a time of fingerprint authentication; a fingerprint verification section that verifies the spectral data matrix, that has been generated at the spectral data generation section, and the registered spectral data matrix, that is archived in the registered spectral data matrix archive section; and an authentication results output section that outputs results of authentication by the fingerprint verification section.

In accordance with a second aspect of the present invention, there is provided a non-transitory computer readable medium storing a program for fingerprint authentication for causing a computer to function as: a fingerprint image correction processing section that generates a histogram of pixel values on the basis of fingerprint image data acquired by a fingerprint being scanned or imaged, and corrects a pixel value of each pixel by using a correction coefficient for making a first pixel value, that relates to the brightest pixel in a group of pixels at which an integrated value of a number of pixels at a dark portion side in the histogram becomes a predetermined proportion with respect to an integrated value of a number of all pixels, be a second pixel value that is brighter than the first pixel value; a spectral data generation section that, from fingerprint image data corrected by the fingerprint image correction processing section, generates a spectral data matrix of which components are directions of ridges of the fingerprint and a frequency of the fingerprint; a fingerprint verification section that verifies the spectral data matrix, that has been generated at the spectral data generation section, and a registered spectral data matrix that is referred to at a time of fingerprint authentication; and an authentication results output section that outputs results of authentication by the fingerprint verification section.

In accordance with the present invention, there can be provided a fingerprint authentication device and a program for fingerprint authentication that, even if there is a fingerprint image in which the fingerprint ridges have been squashed black, can accurately compute spectral data of the directions of the ridges, the frequency of the fingerprint, and the like that are provided for fingerprint authentication.

BRIEF DESCRIPTION OF THE DRAWINGS

Preferred embodiments of the present invention will be described in detail based on the following figures, wherein:

FIG. 8 is a drawing showing the principles of a Sobel operator that is used in the second exemplary embodiment of the present invention;

FIG. 13 is a drawing showing computation of threshold value T at an image correction portion judgment section of a fingerprint authentication device relating to a fourth exemplary embodiment of the present invention.

DETAILED DESCRIPTION OF THE INVENTION

Embodiments of the present invention are described in detail hereinafter with reference to the drawings.

First Exemplary Embodiment

Figure 3:
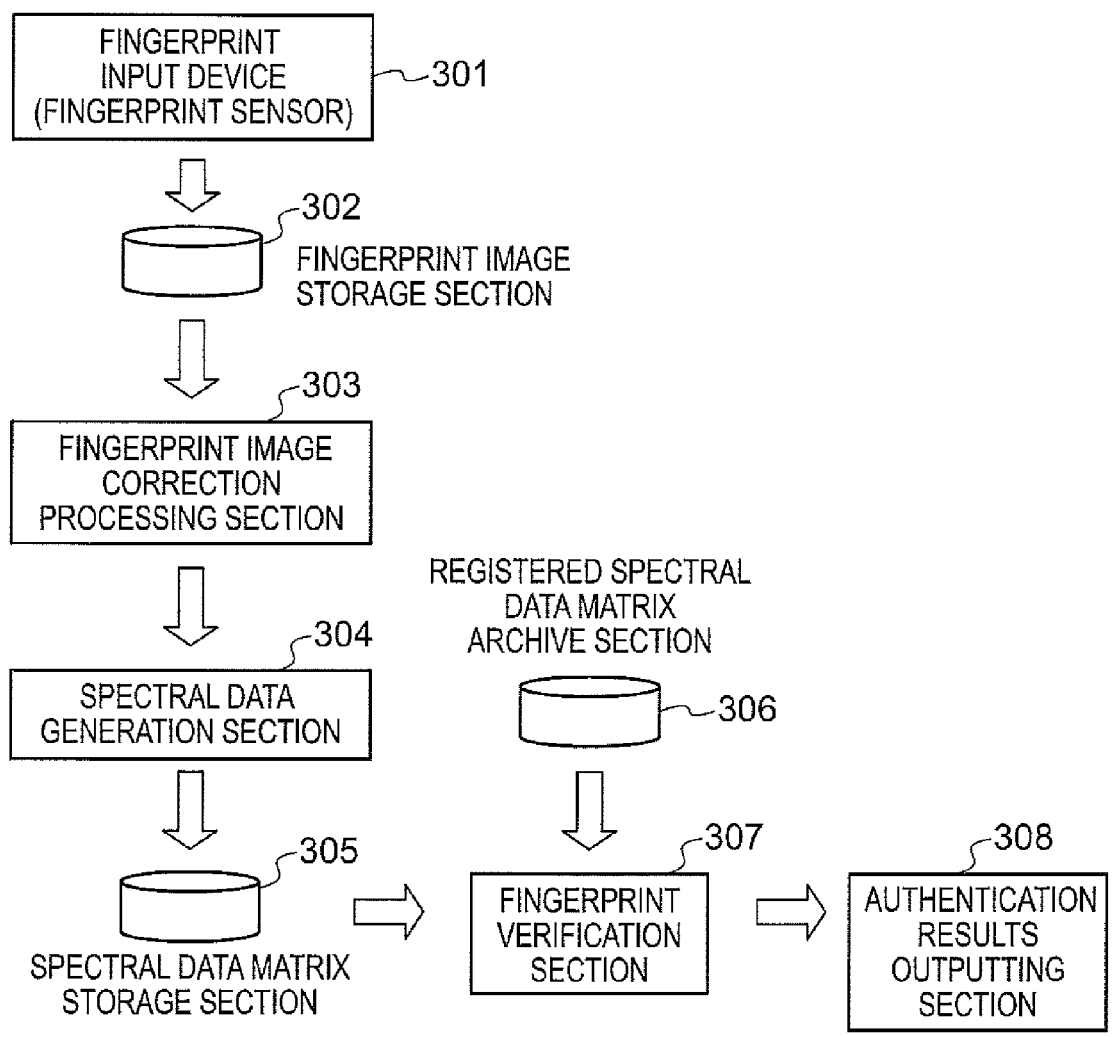
FIG. 3 is a schematic drawing of a fingerprint authentication device relating to a first exemplary embodiment of the present invention.

First, a fingerprint authentication device relating to a first exemplary embodiment of the present invention is described on the basis of FIG. 3. FIG. 3 is a schematic drawing of the fingerprint authentication device relating to the first exemplary embodiment of the present invention.

As shown in FIG. 3, the fingerprint authentication device relating to the first exemplary embodiment of the present invention has: a fingerprint input device 301 that is a fingerprint sensor that scans or images a finger and acquires fingerprint image data; a fingerprint image storage section 302 that stores this fingerprint image data; a fingerprint image correction processing section 303 that corrects the fingerprint image data stored in the fingerprint image storage section 302; a spectral data generation section 304 that computes the directions of the mountain portions of the fingerprint and the frequency of the fingerprint from the fingerprint image data corrected by the fingerprint image correction processing section 303, and generates a spectral data matrix; a spectral data matrix storage section 305 that stores the spectral data matrix; a registered spectral data matrix archive section 306 that archives a registered spectral data matrix that is referred to at the time of fingerprint authentication; a fingerprint verification section 307 that verifies the spectral data matrix stored in the spectral data matrix storage section 305 with the registered spectral data matrix that is archived in the registered spectral data matrix archive section 306; and an authentication results outputting section 308 that outputs results of authentication by the fingerprint verification section 307.

The fingerprint input device 301 is a line sensor or an area sensor for reading the protrusions and indentations of the fingerprint. An optical sensor, an electric field type sensor, or the like is used at the sensor portion thereof.

Figure 1:
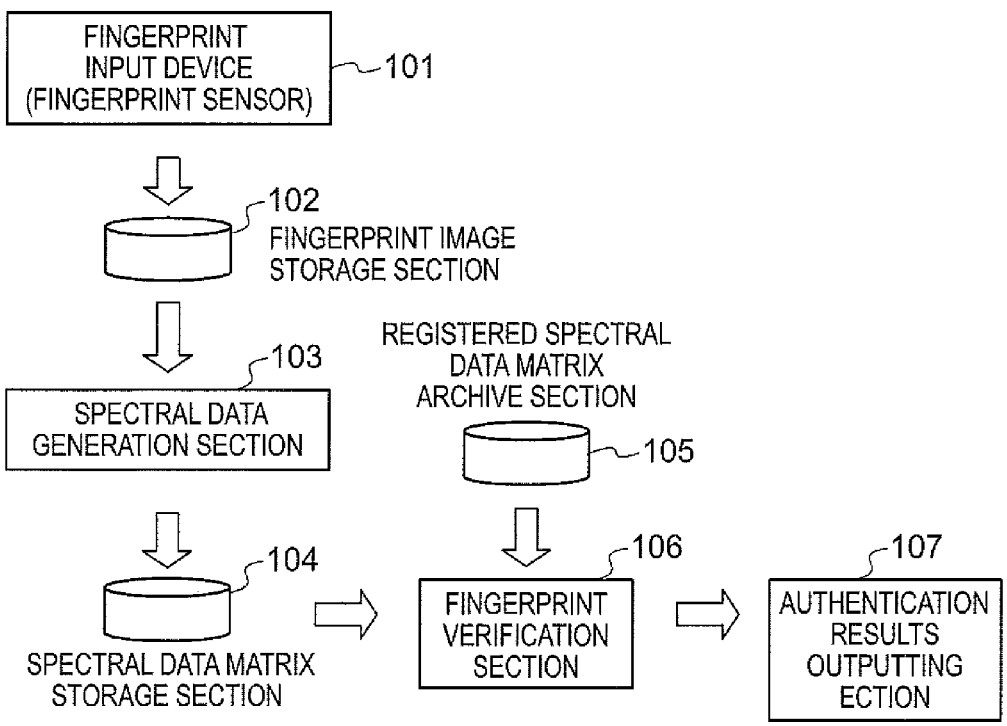
FIG. 1 is a schematic drawing of a fingerprint authentication device in accordance with the prior art.
Figure 2:
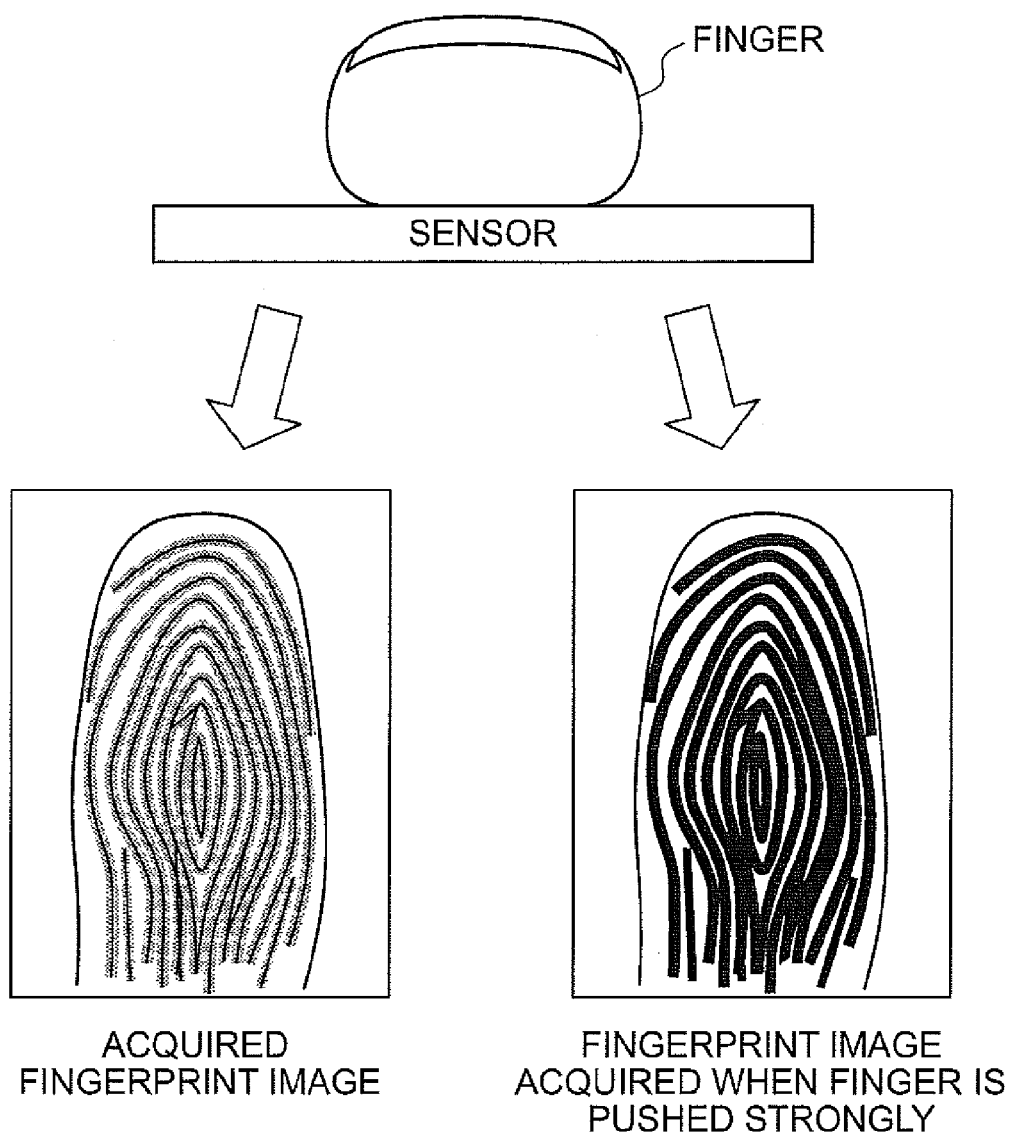
FIG. 2 is a drawing showing states of fingerprint image data acquired by a fingerprint sensor.

The fingerprint input device 301 scans or images the fingerprint of a finger that is pushed against the sensor portion, and acquires fingerprint image data such as shown in the lower portion of FIG. 2.

The fingerprint image data acquired by the fingerprint input device 301 is stored in a fingerprint image storage section 302. The fingerprint image storage section 302 is a storage device such as a RAM (Random Access Memory), an HDD (Hard Disk Drive), a flash memory, or the like.

The fingerprint image correction processing section 303 reads-out the fingerprint image data that is stored in the fingerprint image storage section 302, and corrects the image, in which the ridges of the fingerprint are squashed and become thick as shown in the lower right of FIG. 2, so that the spectral data can be computed accurately. The fingerprint image correction processing section 303 outputs and overwrites the corrected fingerprint image data to the memory region of the original fingerprint image data in the fingerprint image storage section 302.

Details of the fingerprint image data correction processing at the fingerprint image correction processing section 303 are described later.

The spectral data generation section 304 reads-out, from the fingerprint image storage section 302, the fingerprint image data corrected by the fingerprint image correction processing section 303, and divides the read-out fingerprint image data into horizontally-long rectangular images.

For each of the rectangular images generated by the division, the spectral data generation section 303 generates spectral data by digitizing information such as the directions of the ridges of the fingerprint, the frequency that expresses the number of ridges with respect to a unit length, and the like.

Moreover, the spectral data generation section 304 plots, as a matrix, the spectral data obtained at each rectangular image, and generates a spectral data matrix.

The spectral data matrix generated by the spectral data generation section 304 is stored in the spectral data matrix storage section 305. The spectral data matrix storage section 305 is a storage device formed by a RAM, an HDD, a flash memory, or the like.

The fingerprint verification section 307 reads-out a pre-registered spectral data matrix from the registered spectral data matrix archive section 306, and reads-out the spectral data matrix, that was generated by the spectral data generation section 304, from the spectral data matrix storage section 305, and compares the both. From the proportion of similar spectral data, the fingerprint verification section 307 judges matching or non-matching of the spectral data matrices.

Note that the registered spectral data matrix archive section 306 as well is a storage device formed by a RAM, an HDD, a flash memory, or the like.

The results of judgment by the fingerprint verification section 307 are outputted by the authentication results outputting section 308. This authentication results outputting section 308 may be an output device such as a display, a speaker, a printer, or the like.

Figure 4:
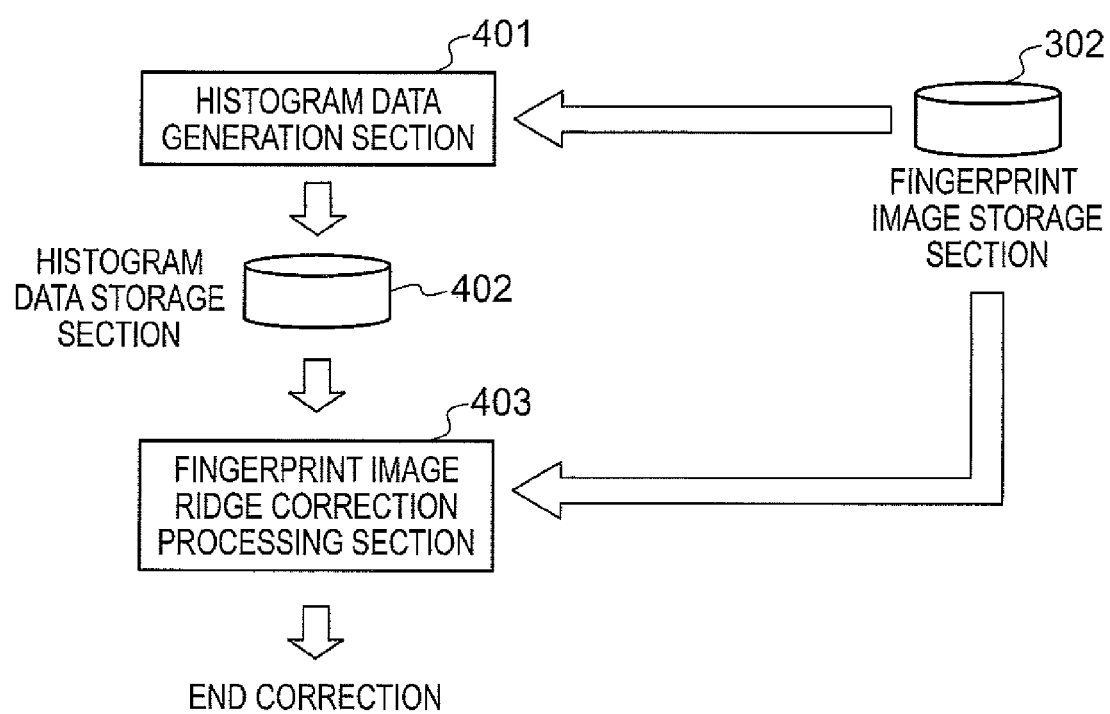
FIG. 4 is a schematic drawing of a fingerprint image correction processing section of the fingerprint authentication device relating to the first exemplary embodiment of the present invention.

The fingerprint image correction processing section 303 in the fingerprint authentication device relating to the first exemplary embodiment of the present invention is described on the basis of FIG. 4. As shown in FIG. 4, the fingerprint image correction processing section has: a histogram data generation section 401 that generates a histogram (a histogram data distribution) of pixel values, in which the number of pixels is on the vertical axis and the brightness (intensity) of the pixel is on the horizontal axis, from fingerprint image data read-out from the fingerprint image storage section 302 shown in FIG. 3; a histogram data storage section 402 that stores the histogram generated by the histogram data generation section 401; and a fingerprint image ridge correction processing section 403 that corrects the pixel value of each pixel by using a correction coefficient for making a first pixel value be a second pixel value that is brighter than the first pixel value, where the first pixel value relates to the brightest pixel in the group of pixels at which the integrated value of the number of pixels at the dark portion side in the histogram stored in the histogram data storage section 402 is a predetermined proportion with respect to the integrated value of the number of all of the pixels.

In FIG. 4, the fingerprint image ridge correction processing section 403 reads-out, from the fingerprint image storage section 302 of FIG. 3, the fingerprint image data that is the same as the fingerprint image data that was used to generate the histogram, and corrects this fingerprint image data as described above. Note that the fingerprint image data, that the histogram data generation section 401 read-out from the fingerprint image storage section 302 and used to generate the histogram, may be stored in the histogram data storage section 402 together with the generated histogram, and this fingerprint image data that is stored in the histogram data storage section 402 may be corrected.

As described above, the fingerprint image ridge correction processing section 403 outputs and overwrites the corrected fingerprint image data to the memory region of the original fingerprint image data in the fingerprint image storage section 302.

Figure 5:
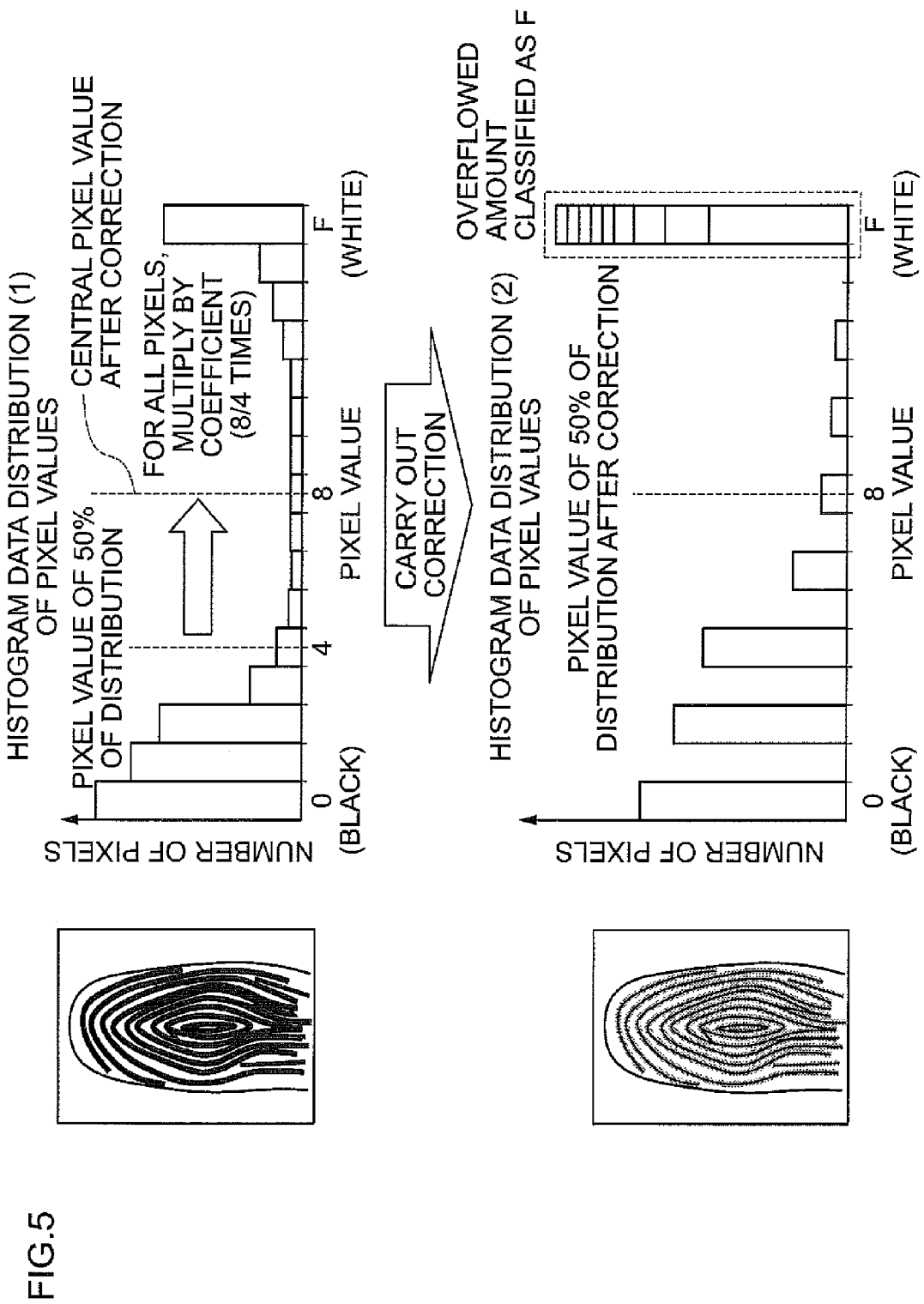
FIG. 5 is a drawing showing the principles of image correction based on a histogram at the fingerprint image correction processing section of the fingerprint authentication device relating to the first exemplary embodiment of the present invention.

FIG. 5 is a drawing showing the principles of image correction based on the histogram at the fingerprint image correction processing section of the fingerprint authentication device relating to the first exemplary embodiment of the present invention.

The upper part of FIG. 5 shows an example of an image in which the ridges of a fingerprint have been squashed black as a result of a finger having strongly pushed the sensor portion, and histogram data distribution (1) that is a histogram of fingerprint image data thereof. In histogram data distribution (1) in the upper part of FIG. 5, the pixels are distributed such that there are more pixels whose pixel values are low, i.e., that are dark, than pixels whose pixel values are high, i.e., bright pixels.

This histogram data distribution (1) is a distribution that the histogram data generation section 401 of FIG. 4 generated from fingerprint image data stored in the fingerprint image storage section 302, and is stored in the histogram data storage section 402 of FIG. 4.

The fingerprint image ridge correction processing section 403 of FIG. 4 determines a central pixel that exists at the center of histogram data distribution (1) that is stored in the histogram data storage section 402.

In the case of FIG. 5, the central pixel that exists at the center of histogram data distribution (1) is the pixel that is brightest in the group of pixels in which the integrated value of the number of pixels at the dark portion side becomes the proportion of 50% of the integrated value of the number of all of the pixels, in histogram data distribution (1). Here, the pixels at the dark portion side are pixels whose pixel values are low, including the darkest pixels whose pixel values are "0" and express black, and mean pixels that exist at the left side in the histogram.

More concretely, the central pixel existing at the center of histogram data distribution (1) is the pixel in histogram data distribution (1) when the integrated value, in a case in which the number of pixels from pixel value "0" of histogram data distribution (1) is integrated, reaches 50% of the integrated value of the number of the pixels in the entire histogram data distribution (1).

In the first exemplary embodiment of the present invention, the aforementioned predetermined portion is determined to be "50%" on the basis of the density of the fingerprint image data after correction, the contrast and resolution, and the characteristics of the algorithm relating to computation of the spectral data by the spectral data generation section 304.

When the algorithm relating to the computation of the spectral data, or the like, differs from the first exemplary embodiment of the present invention, the central pixel that exists at the center of histogram data distribution (1) is made to be "50% of the integrated value of the entire histogram data distribution (1)" as in the first exemplary embodiment of the present invention, but can be determined by experimentation and can be set to any of various values other than 50%.

Next, the fingerprint image ridge correction processing section 403 of FIG. 4 makes the pixel value of the brightest pixel in the group of pixels at which the integrated value of the number of pixels at the dark side becomes a proportion of 50% with respect to the integrated value of the number of all of the pixels in histogram data distribution (1), be a "first pixel value", and corrects this "first pixel value" to become a "second pixel value" that is the central value of the pixel values. Therefore, in the upper part of FIG. 5, the "second pixel value" is called the "central pixel value after correction".

In the case of FIG. 5, the "second pixel value" is the "pixel value at which the darkness/brightness becomes the intermediate value" in histogram data distribution (1).

It is desirable for the existence ratio of the pixels exhibiting dark portions and the pixels exhibiting bright portions to be one-to-one in the histogram of the image applied to fingerprint authentication. From this standpoint, in the first exemplary embodiment, the aforementioned "pixel value at which the darkness/brightness becomes the intermediate value" is the pixel plotted at the center of the horizontal axis of the histogram.

In histogram data distribution (1) of the upper part of FIG. 5 that shows a histogram for fingerprint image data of a gradation of 16, the pixel value at the center of the horizontal axis of the histogram is "8" that corresponds to the intermediate value of the 16 gradations. However, depending on the density of the fingerprint image data after correction, the contrast and resolution, and the characteristics of the algorithm relating to computation of the spectral data by the spectral data generation section 304, the pixel value at the center of the horizontal axis of the histogram may be a pixel value that is shifted toward the bright portion or toward the dark portion from the intermediate value, and not the pixel value that corresponds to the intermediate value of the gradation.

The fingerprint image ridge correction processing section 403 makes the "first pixel value" that is the pixel value of the central pixel become the "second pixel value" that is the "pixel value at which the darkness/brightness becomes the intermediate value" by multiplying the aforementioned pixel value of the central pixel by a correction coefficient k.

In the histogram data distribution (1) of the upper part of FIG. 5, correction is carried out such that "4" that is the "first pixel value" becomes "8" that is the "second pixel value".

Therefore, the correction coefficient k that the pixel value of the central pixel is multiplied by can be computed by "k=(second pixel value)÷(first pixel value)".

In the case of the upper part of FIG. 5, because the "second pixel value" is "8" and the "first pixel value" is "4", "k=8÷4", and the correction coefficient is "2".

The fingerprint image ridge correction processing section 403 multiplies the pixel values of all of the pixels of histogram data distribution (1) of the upper part of FIG. 5 by the correction coefficient k that is computed as described above. Due thereto, the histogram of the fingerprint image data becomes histogram data distribution (2) of the lower part of FIG. 5.

Note that, due to the pixels, that already existed at the white side in histogram data distribution (1) of the upper part of FIG. 5, being multiplied by the correction coefficient k, the pixel values exceed "F" (overflow), but these are all treated as "F" (white).

In histogram data distribution (2) of the lower part of FIG. 5, of the pixels, the portion having a pixel value of "0" that is the darkest portion (black) remains as is without being corrected at all. Because the pixel value is "0" at this portion, there is no change in the value of "0" regardless of what coefficient the pixel value is multiplied by.

With regard to the respective pixel values that have been multiplied by the correction coefficient k, the groups of the respective pixel values are shifted discretely in the direction of the bright portion, except for the group whose pixel value is "0", as shown by histogram data distribution (2) in the lower part of FIG. 5.

For example, as a result of multiplying the before-correction pixel values of "0, 1, 2, 3, 4, . . . , F" by the correction coefficient k (=2), the pixel values after correction are shifted discretely in the direction of the bright portion at a predetermined interval as "0, 2, 4, 6, 8, . . . , F" in histogram data distribution (2) in the lower part of FIG. 5.

Because the regions of the dark pixels that were adjacent are shifted discretely toward the bright region, fingerprint image data whose pixel values vary gradually from dark toward bright can be obtained.

Further, as described above, of the pixels, the portion having a pixel value of "0" that is the darkest portion (black) is not corrected at all and remains as is, and therefore, the contrast of the fingerprint image data also improves.

Note that the range of generating the histogram data is not limited to all of the fingerprint image data. For example, in order to decrease the amount of processing, it is possible to make only the center of the image, where there is a large amount of information of the fingerprint, be the range of histogram generation.

In the first exemplary embodiment, the pixel values of all of the pixels of the histogram are multiplied by the correction coefficient k that is greater than or equal to 1. However, values of respective terms of a sequence expressed by "0, r, 2r, 3r, 4r, . . . Fr" (where r is a real number of greater than or equal to 1) may respectively be added to the pixel values "0" through "F", respectively.

In the first exemplary embodiment, the fingerprint image data in FIG. 5 is 4 bits, but the present exemplary embodiment can also be applied to images of a greater number of gradations, such as 8 bits or the like.

As described above, in accordance with the first exemplary embodiment of the present invention, a conventional fingerprint authentication device is provided with the fingerprint image correction processing section 303 that corrects fingerprint image data by generating a histogram of pixel values and multiplying the central pixel of this histogram by a coefficient such that the central pixel of the histogram comes to the center of the pixel values. Due thereto, the phenomenon of the ridges of the fingerprint thickening by being squashed is mitigated because the pixels, where the ridges of the fingerprint have been squashed and become black, are corrected toward the white side (bright portion).

Further, due to the pixel values of the pixels, that express the dark portions, being discretely shifted toward the bright portion, there are the effects that variations in the brightness/darkness of the pixels of the ridges of the fingerprint can be differentiated, and the concern that a spectral data matrix, in a case in which a fingerprint is pushed strongly, and a spectral data matrix, in a case in which the fingerprint is not pushed strongly, will mistakenly be judged as not matching is mitigated.

Note that, in the first exemplary embodiment, it is a general rule that the inputted fingerprint image data is corrected at the fingerprint image correction processing section 303 of FIG. 3, and a spectral data matrix is generated from the corrected fingerprint image data, and the generated spectral data matrix is verified with a registered spectral data matrix that is archived in the registered spectral data matrix archive section 306 of FIG. 3. However, fingerprint verification processing using the fingerprint image data before image correction, and using the fingerprint image data after image correction by the fingerprint image correction processing section 303, may respectively be carried out so as to also address cases in which fingerprint image data, that is the basis of a registered spectral data matrix, is acquired in a state in which the pressing pressure is high, such as due to the particular way of pressing by the person who inputs the fingerprint or the like, and is made into a registered spectral data matrix without undergoing the image correction relating to the present exemplary embodiment.

Second Exemplary Embodiment

A second exemplary embodiment of the present invention is described next. Here, FIG. 6 is a schematic drawing of a fingerprint authentication device relating to the second exemplary embodiment of the present invention.

Figure 6:
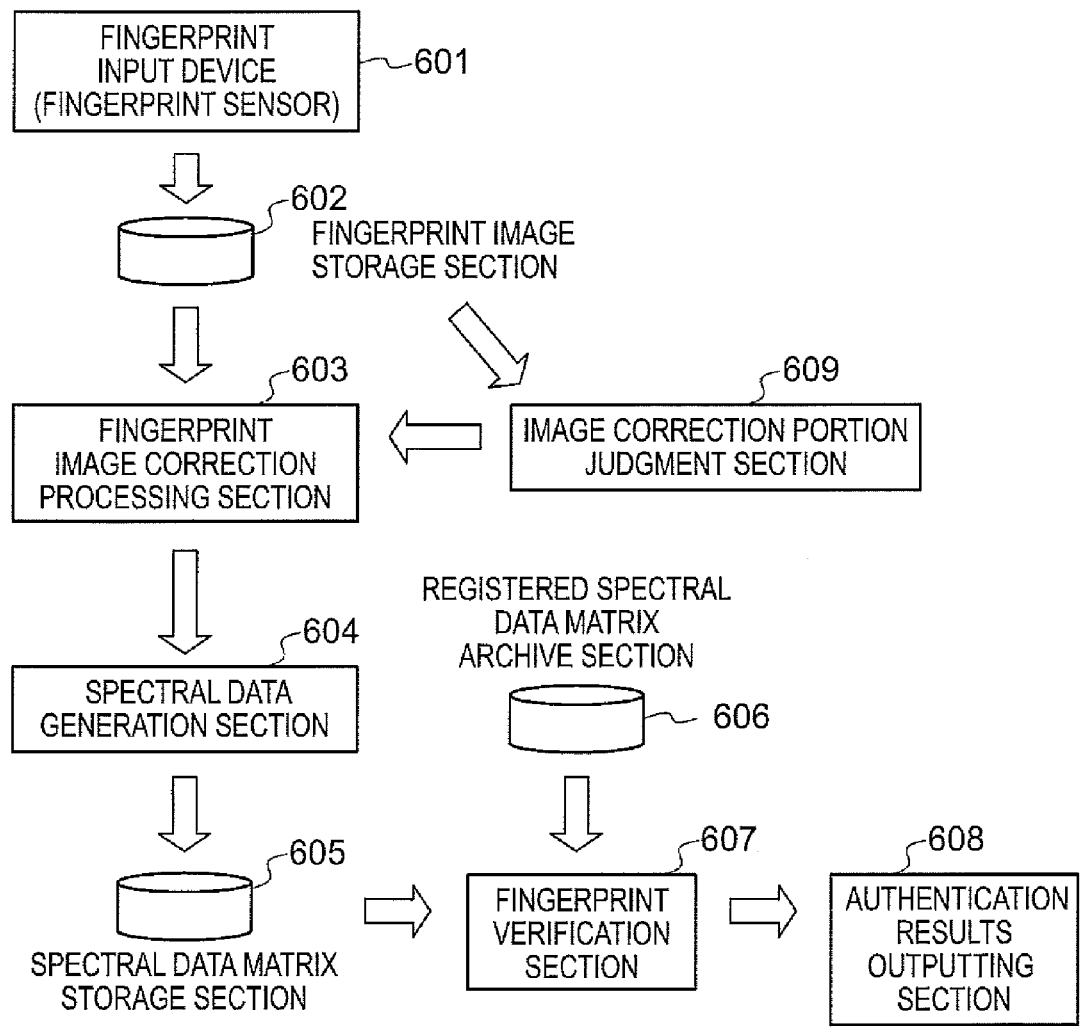
FIG. 6 is a schematic drawing of a fingerprint authentication device relating to a second exemplary embodiment of the present invention.

In accordance with FIG. 6, a fingerprint authentication device relating to the second exemplary embodiment differs from the fingerprint authentication device relating to the first exemplary embodiment with regard to the point that an image correction portion judgment section 609, that specifies a portion needing image correction in the fingerprint image data, is added in the second exemplary embodiment. However, other structures thereof that are a fingerprint input device 601, a fingerprint image storage section 602, a spectral data generation section 604, a spectral data matrix storage section 605, a registered spectral data matrix archive section 606, a fingerprint verification section 607 and an authentication results outputting section 608 are similar to the fingerprint authentication device relating to the first exemplary embodiment, and therefore, description thereof is omitted.

The image correction portion judgment section 609 reads-out the fingerprint image data from the fingerprint image storage section 602, specifies regions requiring image correction in the read-out fingerprint image data, and outputs information regarding the position, the size and the range of the specified region to the fingerprint image correction processing section 603 as correction portion information. The position, size and range of a region that requires correction are, concretely, the coordinates of the pixels of the specified region. The size of the region can be specified in accordance with how many coordinates of pixels that require correction there are, and, if the coordinates of the pixels of a region that requires correction can be grasped, the position and the range of that region can be specified.

On the basis of the correction portion information that is received from the image correction portion judgment section 609, the fingerprint image correction processing section 603 carries out image correction of that portion. The image correction method itself is similar to the first exemplary embodiment.

Figure 7:
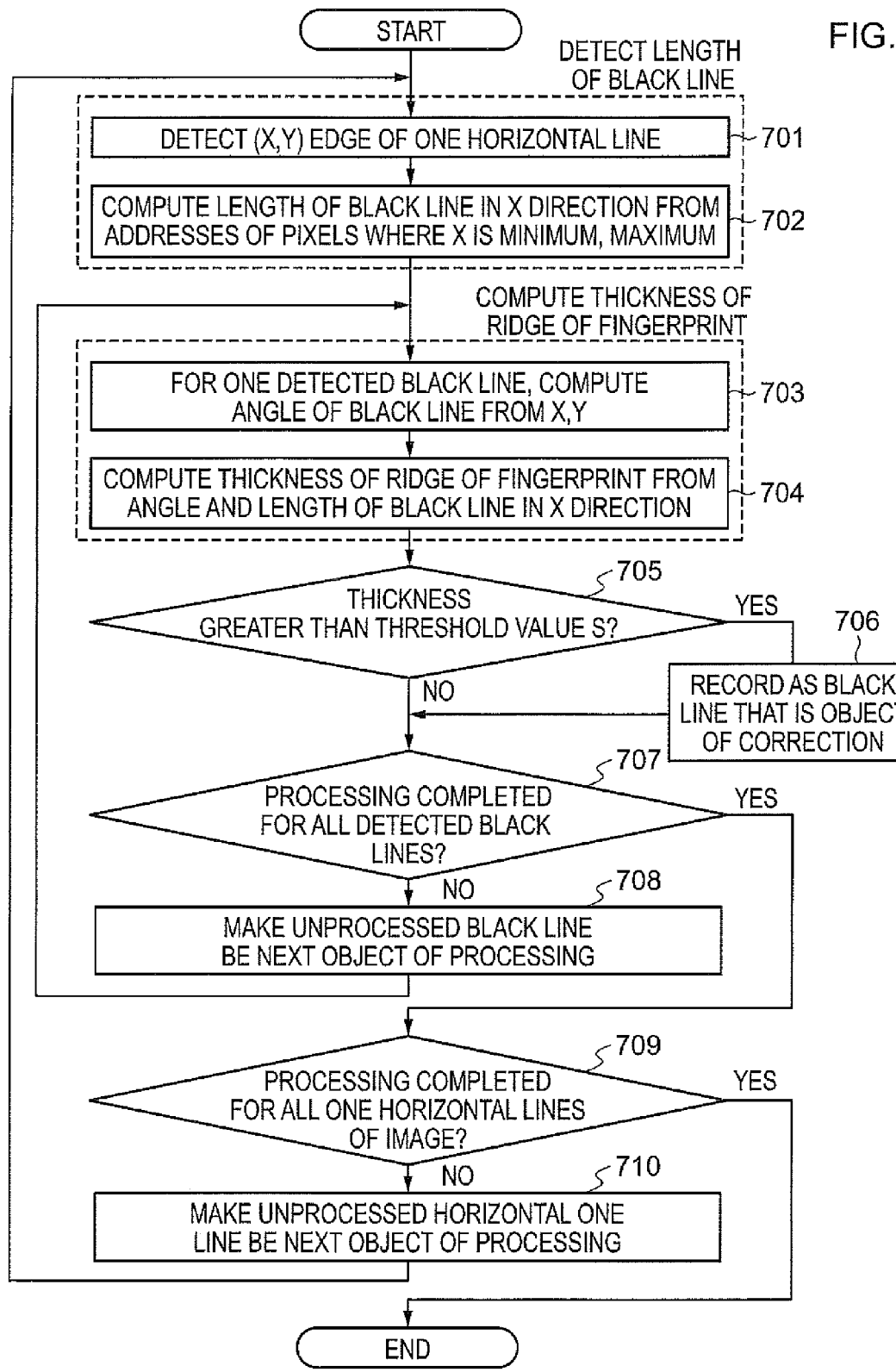
FIG. 7 is a flowchart showing operation of an image correction portion judgment section in the fingerprint authentication device relating to the second exemplary embodiment of the present invention.

Operation of the image correction portion judgment section 609 is described next on the basis of FIG. 7. Here, FIG. 7 is a flowchart showing operation of the image correction portion judgment section 609.

First, in step 701, the image correction portion judgment section 609 reads-out the fingerprint image data from the fingerprint image storage section 302, and, focusing on an arbitrary horizontally-long region (one horizontal line) of the read-out fingerprint image data, detects edges of mountain portions (ridges) and valley portions of the fingerprint.

In the second exemplary embodiment, when detecting the edge portions from the fingerprint image data, the edge portions are not detected all at once from all of the fingerprint image data, and edge detection is carried out on the fingerprint image data per one horizontal line that is a horizontally-long region of a predetermined width.

Figure 8:
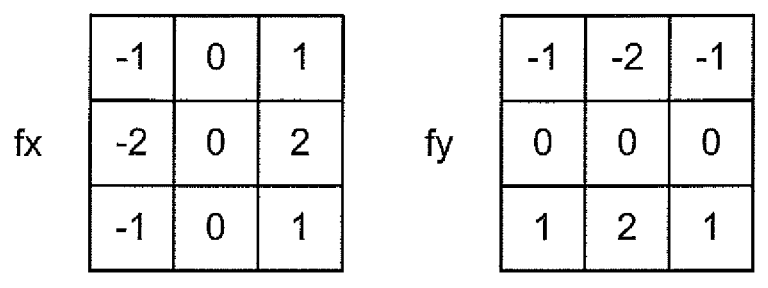

The edge detection uses the Sobel operator shown in FIG. 8. This Sobel operator is applied to each pixel of the fingerprint image data. Pixels, at which the X component fx of the Sobel operator computed thereby is the maximum or the minimum within several pixels, are judged to be edges of mountain portions and valley portions of the fingerprint, and the addresses of the pixels that are edges are stored.

Next, in step 702, a black line length L in the X direction is computed from address fmax at which fx is the maximum and address fmin at which fx is the minimum, among the stored pixel addresses of the edges.

Figure 9:
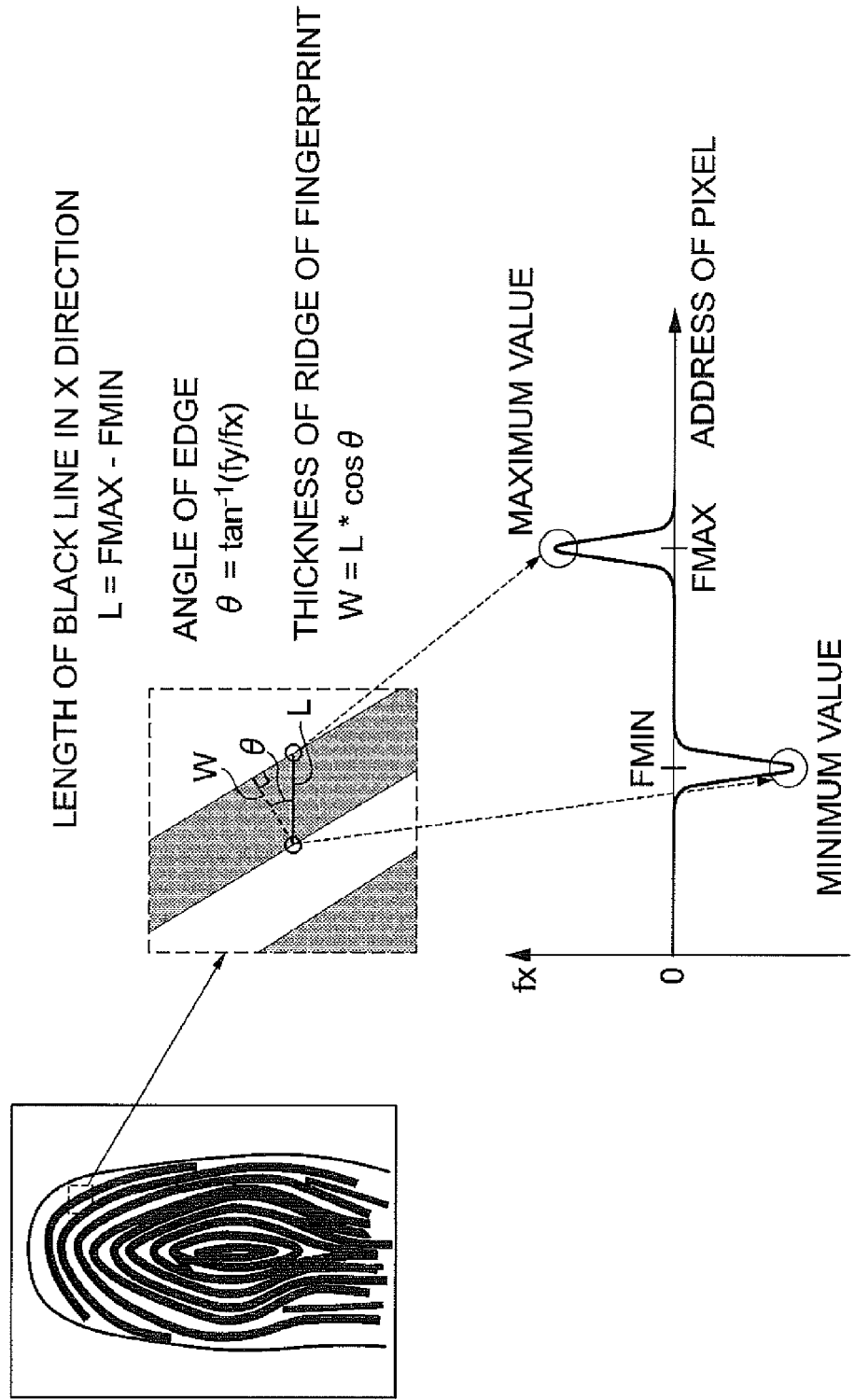
FIG. 9 is a drawing showing a method of computing the thickness of a fingerprint ridge in the fingerprint authentication device relating to the second exemplary embodiment of the present invention.

The concrete computation method thereof is shown in FIG. 9. Here, FIG. 9 is a drawing showing a method of computing the thickness of a fingerprint ridge.

The X component fx of the Sobel operator expresses the amount of change in the pixel value, i.e., the amount of change in the brightness of the pixel. Therefore, when fx is a negative value and is the minimum value, it shows that the pixel at that portion is suddenly becoming dark. Conversely, if fx is a positive value and is the maximum value, it shows that the pixel at that portion is suddenly becoming bright.

Accordingly, in FIG. 9, it can be understood that, if fx is computed from the left to the right of the fingerprint image data, a dark region, i.e., a black line, starts from the pixel of the coordinate fmin that is the minimum value, and the region of the black line ends at the pixel of the coordinate fmax that is the maximum value. This region from coordinate fmin to coordinate fmax can be discriminated to be a black line in the X direction that corresponds to a mountain portion of the fingerprint. A length L of this black line in the X direction can be computed by L=fmax−fmin as shown in FIG. 9 as well.

Next, in step 703, angle θ of the edge is computed in accordance with fx and fy shown in FIG. 8, and the formula shown by following formula (1).

$$\theta = \tan^{-1}(fx/fy) \quad (1)$$

Moreover, in step 704, thickness W of the ridge that is a mountain portion of the fingerprint is computed from the length L of the black line in the X direction and θ, by using the formula shown by following formula (2).

$$W = L * \cos\theta \quad (2)$$

In step 705, when it is judged that the thickness W of the ridge computed in step 704 is greater than a threshold value S, in next step 706, the correction portion information of that region is recorded as a region requiring correction. As described above, the correction portion information of a region requiring correction is the position, the size and the range of that region. Note that the threshold value S can be determined appropriately by experimentation.

In step 707, is it confirmed whether or not the image correction portion judgment section 609 has carried out the processings of steps 703 through 706 for all of the black lines detected from the one horizontal line that is the object of processing. If it is judged that a black line, on which the processings of steps 703 through 706 have not yet been carried out, exists in the one horizontal line that is the object of processing, in step 708, the un-processed black line is made to be the next object of processing, and the processings of steps 703 through 706 are carried out on that black line that has been made to be the object of processing.

If the processings of steps 703 through 706 have been carried out for all of the black lines detected from the one horizontal line that was the object of processing, in step 709, it is confirmed whether or not the processings of step 701 through 707 have been carried out with respect to the other one horizontal lines as well. When the processings of steps 701 through 707 have been carried out for all of the other one horizontal lines as well, the image correction portion judgment section 609 ends the processing of specifying the portion of image correction.

If there is a horizontal one line for which the processings of steps 701 through 707 have not been carried out, in step 710, one horizontal line that has not been processed is made to be the next object of processing, and the processings of steps 701 through 707 are carried out thereon.

Note that the processings of step 707 and step 708 do not have to be carried out with respect to all of the black lines that one horizontal line has. For example, in order to decrease the amount of processing, it is possible to make only the black line, that is at the center of an image in which there is a large amount of information of the fingerprint, be the object.

Further, the processings of step 709 and step 710 also are not limited to all of the horizontal one lines of the fingerprint image data, and it is possible to make only the one horizontal line at the center of the image be the object in order to reduce the amount of processing.

The correction portion information that is obtained by the procedures of above-described steps 701 through 709 is outputted to the fingerprint image correction processing section 603. However, the correction portion information may be stored in the fingerprint image storage section 602, or may be stored in a storage device, such as a memory or the like that the image correction portion judgment section 609 is independently provided with, and the fingerprint image correction processing section 603 may read-out the correction portion information from such storage devices.

Figure 10:
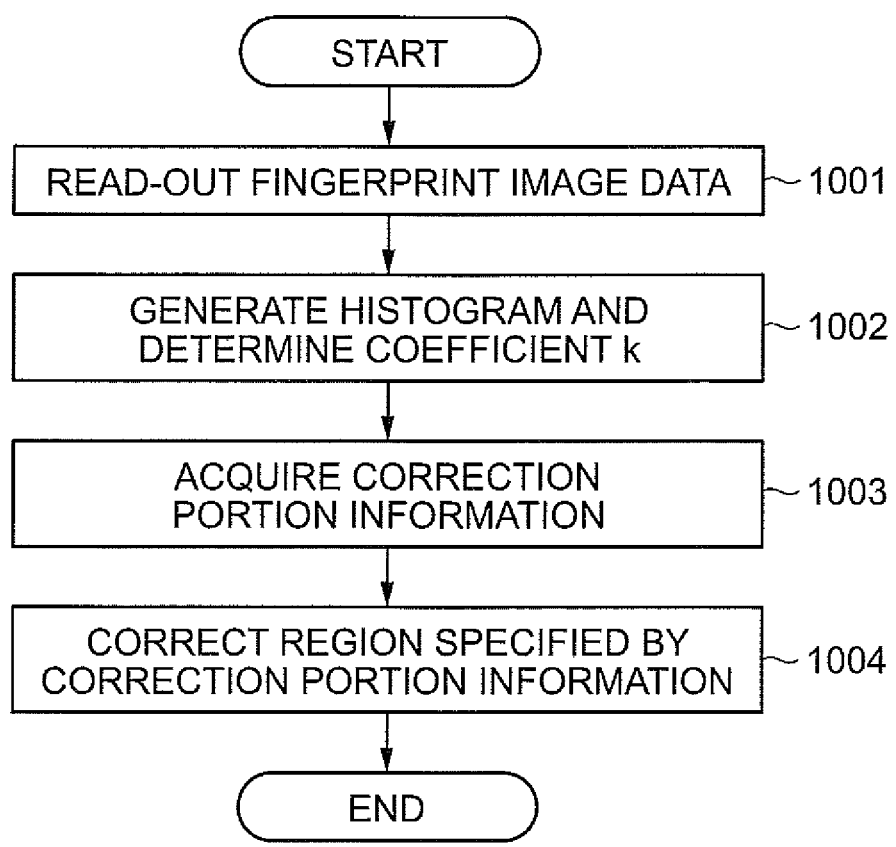
FIG. 10 is a flowchart showing image processing of a fingerprint image correction processing section in the fingerprint authentication device relating to the second exemplary embodiment of the present invention.

The fingerprint image correction processing section 603 carries out image correction on the region described in the correction portion information. Here, FIG. 10 is a flowchart of the image processing of the fingerprint image correction processing section 603 in the fingerprint authentication device relating to the second exemplary embodiment.

First, in step 1001, the fingerprint image data stored in the fingerprint image storage section 602 is read-out. Next, in subsequent step 1002, a histogram is generated from all of the fingerprint image data that is read-out, and the correction coefficient k, by which all of the pixel values in the generated histogram are to be multiplied, is determined by a method similar to that of the first exemplary embodiment from the pixel value of the central pixel existing at the center of the generated histogram and the pixel value at which the darkness/brightness becomes the intermediate value in the histogram.

In step 1003, the fingerprint image correction processing section 603 acquires the correction portion information. In step 1004, the pixel values of the pixels of the region specified by the acquired correction portion information are multiplied by the correction coefficient k determined in step 1002, so as to carry out image correction of that region, and processing ends.

The order of, on the one hand, step 1003 in which the correction portion information is acquired, and, on the other hand, step 1001 in which the fingerprint image data is read-out and step 1002 in which the histogram data is generated, may be reversed.

Note that there are cases in which plural regions requiring correction exist in the fingerprint image data relating to one fingerprint. In this case, as shown in FIG. 10, a histogram is generated in advance for all of the fingerprint image data, and each region requiring correction is corrected by using the correction coefficient k that is determined on the basis of this histogram for all of the fingerprint image data. However, a histogram may be generated for each region, and correction coefficients k may be respectively determined on the basis of the generated histograms that are particular to the respective regions, and the respective regions may be corrected by using the correction coefficient k particular to that region.

Even when plural regions that require correction exist independently and separately in the fingerprint image data, the processes of the image processing are simpler and faster when the correction coefficient k is determined on the basis of a histogram of all of the fingerprint image data and the respective regions are corrected by using this correction coefficient k. However, depending on the density of the fingerprint image data after correction, the contrast and the resolution, and the characteristics of the algorithm relating to computation of the spectral data by the spectral data generation section 604, histograms may be generated for the respective regions, and the correction coefficients k may be respectively determined on the basis of the generated histograms that are particular to the respective regions, and each of the regions may be corrected by using the correction coefficient k particular to that region.

As described above, in accordance with the second exemplary embodiment, by providing the image correction portion judgment section 609 and computing the thickness of the fingerprint ridge and carrying out correction only when the thickness is greater than or equal to a threshold value, it is possible to prevent the fingerprint ridges that were thin before correction from being corrected to be whiter than needed and those fingerprint ridges becoming unable to be distinguished, as compared with a case in which all of the pixels are corrected.

Due thereto, in addition to the effects of the first exemplary embodiment, there is the effect that disappearing of fingerprint ridges due to correction is prevented, and the concern that a spectral data matrix, in a case in which a fingerprint is pushed strongly, and a spectral data matrix, in a case in which the fingerprint is not pushed strongly, will mistakenly be judged as not matching is mitigated.

Third Exemplary Embodiment

A third exemplary embodiment of the present invention is described next.

The structure of a fingerprint authentication device relating to the third exemplary embodiment is the same as the second exemplary embodiment shown in FIG. 6, but the processing method of the image correction portion judgment section 609 differs from the second exemplary embodiment. The image correction portion judgment section 609 of the fingerprint authentication device relating to the third exemplary embodiment removes noise components that are included in the fingerprint image data, and detects edge intensities that express the ridges of the fingerprint.

There are cases in which light sweat, sebum, dust and the like adhere to a fingerprint whose fingerprint image data is read, and if the fingerprint is scanned or imaged in a state in which such substances are adhering thereto, these substances can become a source of noise. Further, dirt on the sensor portion also becomes a source of generation of noise, and noise that is generated from the power source of the fingerprint authentication device also cannot be ignored.

The image correction portion judgment section 609 of the fingerprint authentication device relating to the third exemplary embodiment removes, from the fingerprint image data, noises that arise due to all of these causes, and is made able to detect only the edge intensities that express the fingerprint ridges.

Figure 11:
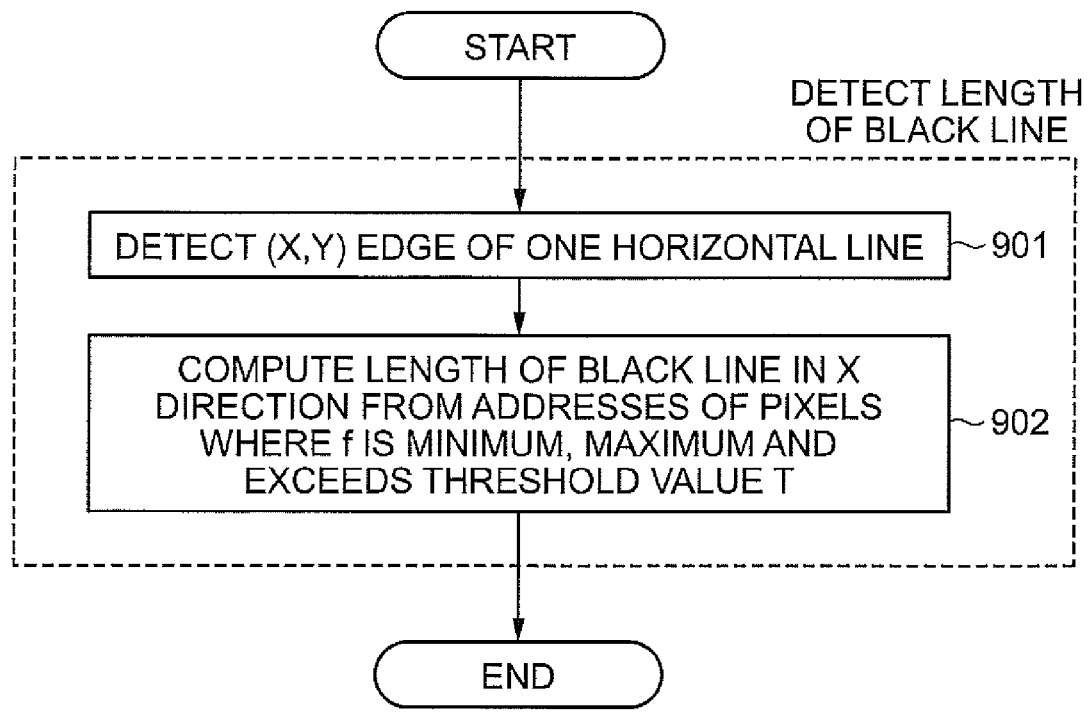
FIG. 11 is a flowchart showing the operation of edge detection of an image correction portion judgment section in a fingerprint authentication device relating to a third exemplary embodiment of the present invention.

FIG. 11 is a flowchart showing the edge detection operation of the image correction portion judgment section 609 relating to the third exemplary embodiment. Because operations other than the edge detection of the image correction portion judgment section 609 are the same as the second exemplary embodiment, description thereof is omitted.

First, in step 901, the image correction portion judgment section 609 focuses on an arbitrary one horizontal line, and detects edges of mountain portions and valley portions of the fingerprint. The method of detection is similar to the second exemplary embodiment, and coordinates at which the X component fx of the Sobel operator is the maximum or the minimum are candidates for edge portions.

Further, in step 902, when the X component fx of the Sobel operator is the maximum or the minimum within several pixels and the absolute value of the edge intensity thereof exceeds a threshold value T (an edge intensity threshold value), it is judged to be an edge between a mountain portion and a valley portion of the fingerprint and the address of the pixel is stored, and the length of a black line in the X direction from the stored pixel address is computed.

Figure 12:
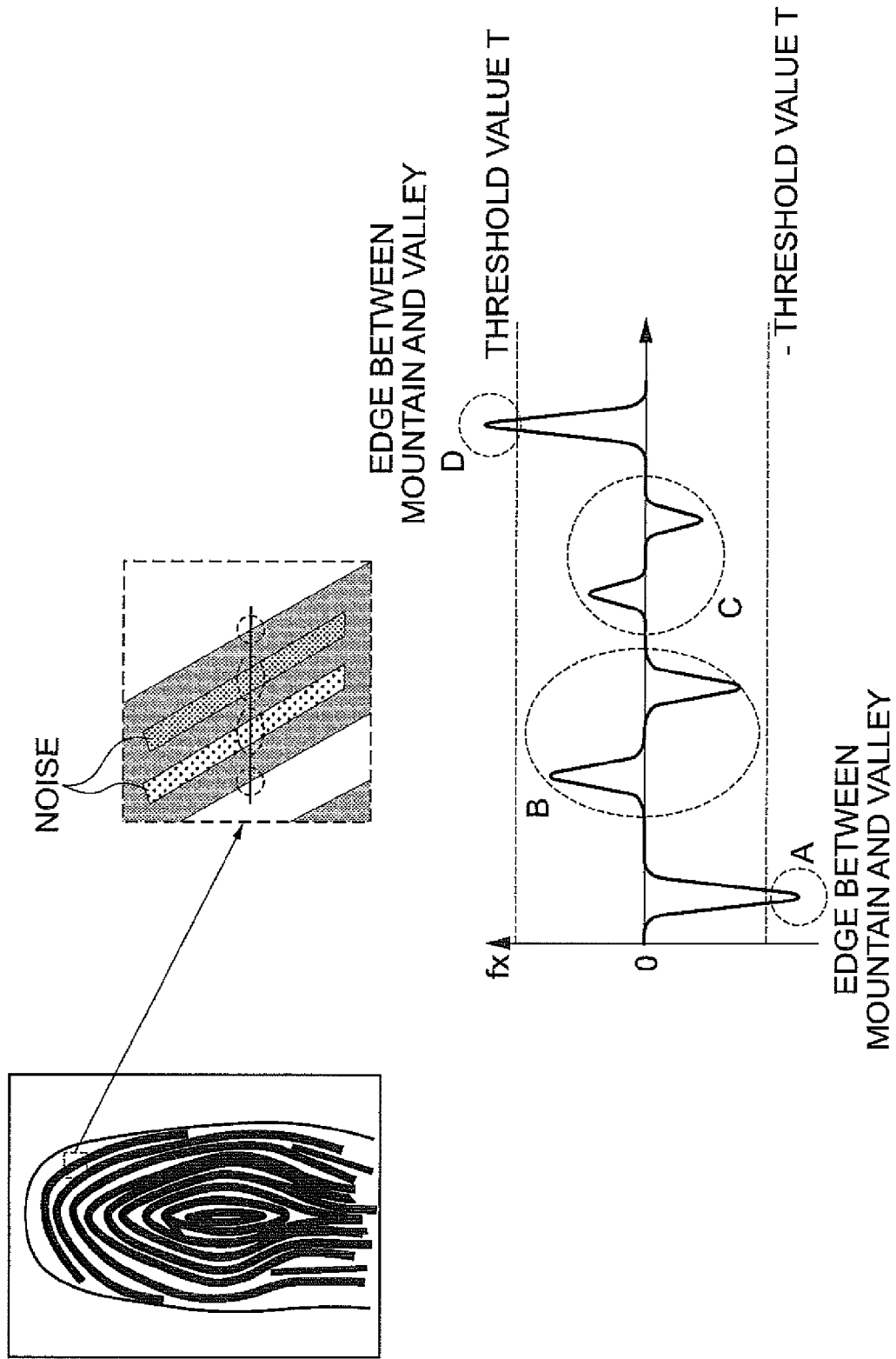
FIG. 12 is a drawing showing a concrete example of a method of detecting a fingerprint ridge of the image correction portion judgment section in the fingerprint authentication device relating to a third exemplary embodiment of the present invention.

A concrete example of the method of detecting a fingerprint ridge in the third exemplary embodiment is shown in FIG. 12. In FIG. 12, point A and point D, where the absolute value of the X component fx of the Sobel operator is greater than the absolute value of the threshold value T, are judged to be edges between a mountain portion and a valley portion of a fingerprint. On the other hand, at region B and region C, fx is the maximum and the minimum within several pixels, but the absolute value thereof does not exceed the absolute value of the threshold value T, and therefore, region B and region C are judged to be noise. Note that the threshold value T can be determined statistically through experimentation.

As described above, in accordance with the third exemplary embodiment, in the detection of the length of a black line in the X direction by the image correction portion judging section 609, the threshold value T for judging that points are edges between a mountain portion and a valley portion of the fingerprint is provided, and only the points at which the absolute value of the edge intensity is greater than or equal to the absolute value of the threshold value T are used in detecting the length of the black line. Due thereto, when, in a region that is a fingerprint ridge, there is a portion where the black color of the ridge becomes lighter due to noise, that portion can be prevented from being erroneously judged as an edge between a mountain portion and a valley portion of the fingerprint.

Due thereto, in addition to the effects of the second exemplary embodiment, there is the effect that, even with regard to fingerprint image data in which there is noise at the fingerprint ridges, the possibility that a spectral data matrix, in a case in which a fingerprint is pushed strongly, and a spectral data matrix, in a case in which the fingerprint is not pushed strongly, will mistakenly be judged as not matching is reduced.

Fourth Exemplary Embodiment

A fourth exemplary embodiment of the present invention is described next.

Although the structure of a fingerprint authentication device relating to the fourth exemplary embodiment is the same as the second exemplary embodiment of FIG. 6, the processing method of the image correction portion judgment section 609 differs from the second exemplary embodiment.

Because the operation relating to edge detection by the image correction portion judgment section 609 is similar to the third exemplary embodiment, description thereof is omitted.

FIG. 13 is a drawing showing computation of the threshold value T at the image correction portion judgment section 609 of the fingerprint authentication device relating to the fourth exemplary embodiment of the present invention.

In FIG. 13, the magnitude of the threshold value T for judging an edge between a mountain portion and a valley portion of a fingerprint is computed on the basis of the edge intensity at the border between the finger and the periphery thereof, as shown in FIG. 13.

The portion in the fingerprint image data where the brightness/darkness difference is the greatest is the border between the finger and the periphery thereof. Therefore, the absolute value of the edge intensity of this border is the maximum value of the absolute values of the edge intensities computed from all of the fingerprint image data.

As shown in FIG. 13, the absolute value of the edge intensity relating to the border between the finger and the periphery exhibits a notable value Xe, and exceeds the absolute value of the edge intensity of a ridge of the fingerprint.

Thus, in the fourth exemplary embodiment, the threshold value T is computed by multiplying Xe, that is the maximum value of the edge intensities, by a coefficient 1/m.

To what extent the coefficient 1/m should be set is computed statistically through experimentation. However, as shown in FIG. 13, the coefficient 1/m is adjusted to a value of an extent such that the threshold value T is slightly less than the absolute value of the edge intensity of a fingerprint ridge.

If the coefficient 1/m is determined in advance, a threshold value that is appropriate for each fingerprint image data can be set, even in cases in which the edge intensity is manifested more strongly or more weakly overall per fingerprint image data due to the sensitivity of the sensor.

When edge intensity is manifested strongly in the overall image, the edge intensity at the border between the finger and the periphery thereof and the edge intensity of the ridges of the fingerprint also is manifested strongly. Therefore, if the edge intensity of the border between the finger and the periphery is multiplied by the coefficient 1/m, the threshold value T that corresponds to the edge intensity of the ridges of the fingerprint that is manifested strongly can be computed.

Similarly, also when the edge intensity is manifested weakly in the overall image, if the edge intensity of the border between the finger and the periphery is multiplied by the coefficient 1/m, the threshold value T that corresponds to the edge intensity of the ridges of the fingerprint that is manifested weakly can be computed.

As described above, in accordance with the fourth exemplary embodiment, in the detection of the length of a black line in the X direction by the image correction portion judgment section 609, a threshold value for judging that a point is an edge between a mountain portion and a valley portion of a fingerprint is computed from the edge intensity at the border between the finger and the periphery thereof. Due thereto, even when the edge intensity of the fingerprint image data is manifested strongly or is manifested weakly due to the sensitivity of the sensor, the threshold value can be set to a value that is appropriate for each fingerprint image data.

Due thereto, in addition to the effects of the third exemplary embodiment, there is the effect that, even when there is variation in the strength/weakness of the edge intensity per fingerprint image data, the concern that a spectral data matrix, in a case in which a fingerprint is pushed strongly, and a spectral data matrix, in a case in which the fingerprint is not pushed strongly, will mistakenly be judged as not matching is reduced.

Embodiments of the present invention are described above, but the present invention is not limited to the embodiments as will be clear to those skilled in the art.

What is claimed is:

1. A fingerprint authentication device comprising:
a fingerprint sensor that scans or images a fingerprint and acquires fingerprint image data;
a processor comprising
a fingerprint image correction section that generates a histogram of pixel values on the basis of the fingerprint image data acquired by the fingerprint sensor, and corrects a pixel value of each pixel by using a correction coefficient for making a first pixel value, that relates to the brightest pixel in a group of pixels at which an integrated value of a number of pixels at a dark portion side in the histogram becomes a predetermined proportion with respect to an integrated value of a number of all pixels, be a second pixel value that is brighter than the first pixel value, and
a spectral data generation section that, from fingerprint image data corrected by the fingerprint image correction section, generates a spectral data matrix of which components are directions of ridges of the fingerprint and a frequency of the fingerprint;
a memory that archives a registered spectral data matrix that is referred to at a time of fingerprint authentication,
the processor further comprising a fingerprint verification section that verifies the spectral data matrix that has been generated at the spectral data generation section, and the registered spectral data matrix that is archived in the memory; and
an output device that outputs results of authentication by the fingerprint verification section,
wherein the fingerprint image correction section carries out image correction on a region of the imaged fingerprint in which a thickness of a portion corresponding to a ridge of the fingerprint is greater than a predetermined threshold value, the portion corresponding to the ridge of the fingerprint is calculated from coordinates of a pixel at which a computed edge intensity is a minimum and coordinates of a pixel at which the computed edge intensity is a maximum.

2. The fingerprint authentication device of claim 1, wherein the fingerprint image correction section makes the predetermined proportion be a value within a predetermined range that includes 50%, and makes the second pixel value be a pixel value within a predetermined range that includes a central value of pixel values in the histogram, and the correction comprises multiplying pixel values of respective pixels by the correction coefficient.

3. The fingerprint authentication device of claim 1, wherein the processor further comprises an image correction portion judgment section that reads-out the fingerprint image data from a fingerprint memory, computes the edge intensity of each pixel of the fingerprint image data, calculates the thickness of the portion corresponding to the ridge of the fingerprint, and if the thickness of the portion is greater than the predetermined threshold value, judges that the portion is a region requiring correction, and outputs a position, a size and a range of the region to the fingerprint image correction section as correction portion information,
wherein the fingerprint image correction section carries out the image correction on the region corresponding to the correction portion information.

4. The fingerprint authentication device of claim 3, wherein the image correction portion judgment section judges that the computed edge intensity is an edge intensity relating to a ridge of the fingerprint, if an absolute value of the edge intensity is greater than a predetermined edge intensity threshold value.

5. The fingerprint authentication device of claim 4, wherein the image correction portion judgment section determines the predetermined edge intensity threshold value by multiplying an absolute value of a maximum value of edge intensities, that is computed from all of the fingerprint image data, by a predetermined coefficient.

6. A non-transitory computer readable medium storing a program for fingerprint authentication for causing a computer to function as:
   a fingerprint image correction processing section that generates a histogram of pixel values on the basis of fingerprint image data acquired by a fingerprint being scanned or imaged, and corrects a pixel value of each pixel by using a correction coefficient for making a first pixel value, that relates to the brightest pixel in a group of pixels at which an integrated value of a number of pixels at a dark portion side in the histogram becomes a predetermined proportion with respect to an integrated value of a number of all pixels, be a second pixel value that is brighter than the first pixel value;
   a spectral data generation section that, from fingerprint image data corrected by the fingerprint image correction processing section, generates a spectral data matrix of which components are directions of ridges of the fingerprint and a frequency of the fingerprint;
   a fingerprint verification section that verifies the spectral data matrix, that has been generated at the spectral data generation section, and a registered spectral data matrix that is referred to at a time of fingerprint authentication; and
   an authentication results output section that outputs results of authentication by the fingerprint verification section,
   wherein the fingerprint image correction processing section carries out image correction on a region of the imaged fingerprint in which a thickness of a portion corresponding to a ridge of the fingerprint is greater than a predetermined threshold value, the portion corresponding to the ridge of the fingerprint is calculated from coordinates of a pixel at which a computed edge intensity is a minimum and coordinates of a pixel at which the computed edge intensity is a maximum.

7. The non-transitory computer readable medium of claim 6, wherein the fingerprint image correction processing section makes the predetermined proportion be a value within a predetermined range that includes 50%, and makes the second pixel value be a pixel value within a predetermined range that includes a central value of pixel values in the histogram, and the correction comprises multiplying pixel values of respective pixels by the correction coefficient.

8. The non-transitory computer readable medium of claim 6, wherein the program for fingerprint authentication further causes the computer to function as an image correction portion judgment section that reads-out the fingerprint image data from a fingerprint image storage section, computes the edge intensity of each pixel of the fingerprint image data, calculates the thickness of the portion corresponding to the ridge of the fingerprint, and if the thickness of the portion is greater than the predetermined threshold value, judges that the portion is a region requiring correction, and outputs a position, a size and a range of the region to the fingerprint image correction processing section as correction portion information, and
   the fingerprint image correction processing section carries out the image correction on the region corresponding to the correction portion information.

9. The non-transitory computer readable medium of claim 8, wherein the image correction portion judgment section judges that the computed edge intensity is an edge intensity relating to a ridge of the fingerprint, if an absolute value of the edge intensity is greater than a predetermined edge intensity threshold value.

10. The non-transitory computer readable medium of claim 9, wherein the image correction portion judgment section determines the predetermined edge intensity threshold value by multiplying an absolute value of a maximum value of edge intensities, that is computed from all of the fingerprint image data, by a predetermined coefficient.

* * * * *